(12) United States Patent
Park et al.

(10) Patent No.: US 11,778,605 B2
(45) Date of Patent: Oct. 3, 2023

(54) METHOD AND DEVICE FOR TRANSMITTING/RECEIVING INTER-UE COORDINATION MESSAGE IN NR V2X

(71) Applicant: LG ELECTRONICS INC., Seoul (KR)

(72) Inventors: Giwon Park, Seoul (KR); Seoyoung Back, Seoul (KR); Seungmin Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/150,006

(22) Filed: Jan. 4, 2023

(65) Prior Publication Data

US 2023/0147699 A1    May 11, 2023

Related U.S. Application Data

(63) Continuation of application No. PCT/KR2021/014911, filed on Oct. 22, 2021.

(30) Foreign Application Priority Data

Oct. 22, 2020   (KR) .................. 10-2020-0137427

(51) Int. Cl.
*H04W 4/00* (2018.01)
*H04W 72/1263* (2023.01)
*H04W 72/25* (2023.01)

(52) U.S. Cl.
CPC ....... *H04W 72/1263* (2013.01); *H04W 72/25* (2023.01)

(58) Field of Classification Search
CPC .................. H04W 72/1263; H04W 72/25
See application file for complete search history.

(56) References Cited

U.S. PATENT DOCUMENTS

2018/0139724 A1*  5/2018  Loehr ................ H04W 72/02
2021/0028910 A1*  1/2021  Cheng ................ H04L 1/1896
(Continued)

FOREIGN PATENT DOCUMENTS

EP    3817262 A1 *  5/2021  .......... H04L 1/0026
EP    3817505 A1 *  5/2021  .......... H04B 7/0626
(Continued)

OTHER PUBLICATIONS

PCT International Application No. PCT/KR2021/014911, International Search Report dated Jan. 21, 2022, 4 pages.
(Continued)

*Primary Examiner* — Thai D Hoang
(74) *Attorney, Agent, or Firm* — LEE, HONG, DEGERMAN, KANG & WAIMEY PC

(57) ABSTRACT

A method by which a first device performs wireless communication, and a device for supporting same are provided. The method may comprise the steps of: transmitting, to a second device, through a physical sidelink control channel (PSCCH), first sidelink control information (SCI) for the scheduling of second sidelink control information (SCI) and a physical sidelink shared channel (PSSCH), the first SCI including information related to a frequency resource allocation, information related to a time resource allocation, and information related to the format of the second SCI; and transmitting, to the second device, through the PSSCH, an inter-UE coordination message and the second SCI including a source ID and a destination ID. The inter-UE coordination message can include information related to a preferred resource or information related to a non-preferred resource, and information indicating that the inter-UE coordination message has been transmitted can be included in the first SCI or the second SCI.

20 Claims, 18 Drawing Sheets

(56) References Cited

U.S. PATENT DOCUMENTS

| | | | |
|---|---|---|---|
| 2021/0360603 A1* | 11/2021 | Wang | H04L 5/0094 |
| 2022/0015186 A1* | 1/2022 | Jeong | H04L 1/1896 |
| 2022/0225408 A1* | 7/2022 | Lee | H04W 74/0808 |
| 2022/0225469 A1* | 7/2022 | Lee | H04W 76/28 |
| 2022/0240225 A1* | 7/2022 | Lee | H04W 72/02 |
| 2022/0256539 A1* | 8/2022 | Xue | H04W 72/02 |

FOREIGN PATENT DOCUMENTS

| | | | | |
|---|---|---|---|---|
| ES | 2935524 T3 * | 9/2020 | | H04W 72/02 |
| ES | 2926058 T3 * | 10/2022 | | H04B 7/0626 |
| TW | 202137805 A * | 10/2021 | | H04L 12/2869 |
| TW | 202139635 A * | 10/2021 | | H04L 1/1812 |
| WO | 2020-198760 | 10/2020 | | |
| WO | WO-2021071330 A1 * | 4/2021 | | |
| WO | WO-2021080347 A1 * | 4/2021 | | H04W 24/10 |
| WO | WO-2021215829 A1 * | 10/2021 | | H04W 52/10 |
| WO | WO-2021230672 A1 * | 11/2021 | | H04L 1/1812 |
| WO | WO-2022013717 A2 * | 1/2022 | | |
| WO | WO-2022019643 A1 * | 1/2022 | | |
| WO | WO-2022055254 A1 * | 3/2022 | | |
| WO | WO-2022071741 A1 * | 4/2022 | | |
| WO | WO-2022086271 A1 * | 4/2022 | | |
| WO | WO-2022092894 A1 * | 5/2022 | | |
| WO | WO-2022139510 A1 * | 6/2022 | | |
| WO | WO-2022149904 A1 * | 7/2022 | | |
| WO | WO-2022154475 A1 * | 7/2022 | | |
| WO | WO-2022154640 A1 * | 7/2022 | | H04L 1/1812 |
| WO | WO-2022205239 A1 * | 10/2022 | | |
| WO | WO-2023043283 A1 * | 3/2023 | | |

OTHER PUBLICATIONS

TCL Communication, "Feasibility and benefits for Mode 2 enhancements," R1-2005774, 3GPP TSG RAN WG1 #102-e, e-Meeting, Aug. 2020, 7 pages.

Mediatek Inc., "Discussion on Mode 2 enhancements," R1-2005645, 3GPP TSG RAN WG1 #102, e-Meeting, Aug. 2020, 5 pages.

Robert Bosch GMBH, "Sidelink Resource Allocation Enhancements," R1-2006876, 3GPP TSG RAN WG1 #102-e, E-Meeting, Aug. 2020, 7 pages.

Oppo, "Inter-UE coordination in mode 2 of NR sidelink," R1-2006011, 3GPP TSG RAN WG1 #102-e, e-Meeting, Aug. 2020, 5 pages.

* cited by examiner

METHOD AND DEVICE FOR TRANSMITTING/RECEIVING INTER-UE COORDINATION MESSAGE IN NR V2X

CROSS-REFERENCE TO RELATED APPLICATIONS

This application is a continuation of International Application No. PCT/KR2021/014911, filed on Oct. 22, 2021, which claims the benefit of earlier filing date and right of priority to Korean Application No. 10-2020-0137427, filed on Oct. 22, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, an inter-UE coordination message may be transmitted by being included in a medium access control (MAC) service data unit (SDU) or a MAC control element (CE) within a MAC protocol data unit (PDU). For example, in case that the inter-UE coordination message is included in the MAC CE, since the MAC CE does not have a mapping logical channel (e.g., sidelink traffic channel (STCH), sidelink control channel (SCCH)), a problem in which a priority of the MAC CE is ambiguous may occur when the UE includes the MAC CE for the inter-UE coordination message in the MAC PDU based on a logical channel prioritization (LCP) procedure. For example, in case that the inter-UE coordination message is included in the MAC SDU, since a logical channel (e.g., sidelink traffic channel (STCH), sidelink control channel (SCCH)) to which the inter-UE coordination message is mapped is not currently defined, a problem in which a priority of the MAC SDU is ambiguous may occur when the UE includes the MAC SDU for the inter-UE coordination message in the MAC PDU based on a logical channel prioritization (LCP) procedure. As described above, if a priority related to the inter-UE coordination message is not clearly defined, the UE cannot perform the LCP procedure for generating the MAC PDU.

Furthermore, if the UE-A transmits an inter-UE coordination message to the UE-B, the UE-B may not be able to distinguish whether the message transmitted by the UE-A is an inter-UE coordination message or a general data/message. Since an inter-UE coordination message is information considered for efficiently selecting SL resources, the UE-B needs to quickly recognize that the message transmitted by the UE-A is an inter-UE coordination message.

In one embodiment, provided is a method for performing wireless communication by a first device. The method may comprise: transmitting, to a second device through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and transmitting, to the second device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

In one embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: transmit, to a second device through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and transmit, to the second device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

The UE can efficiently perform SL communication.

DETAILED DESCRIPTION

Figure 1:
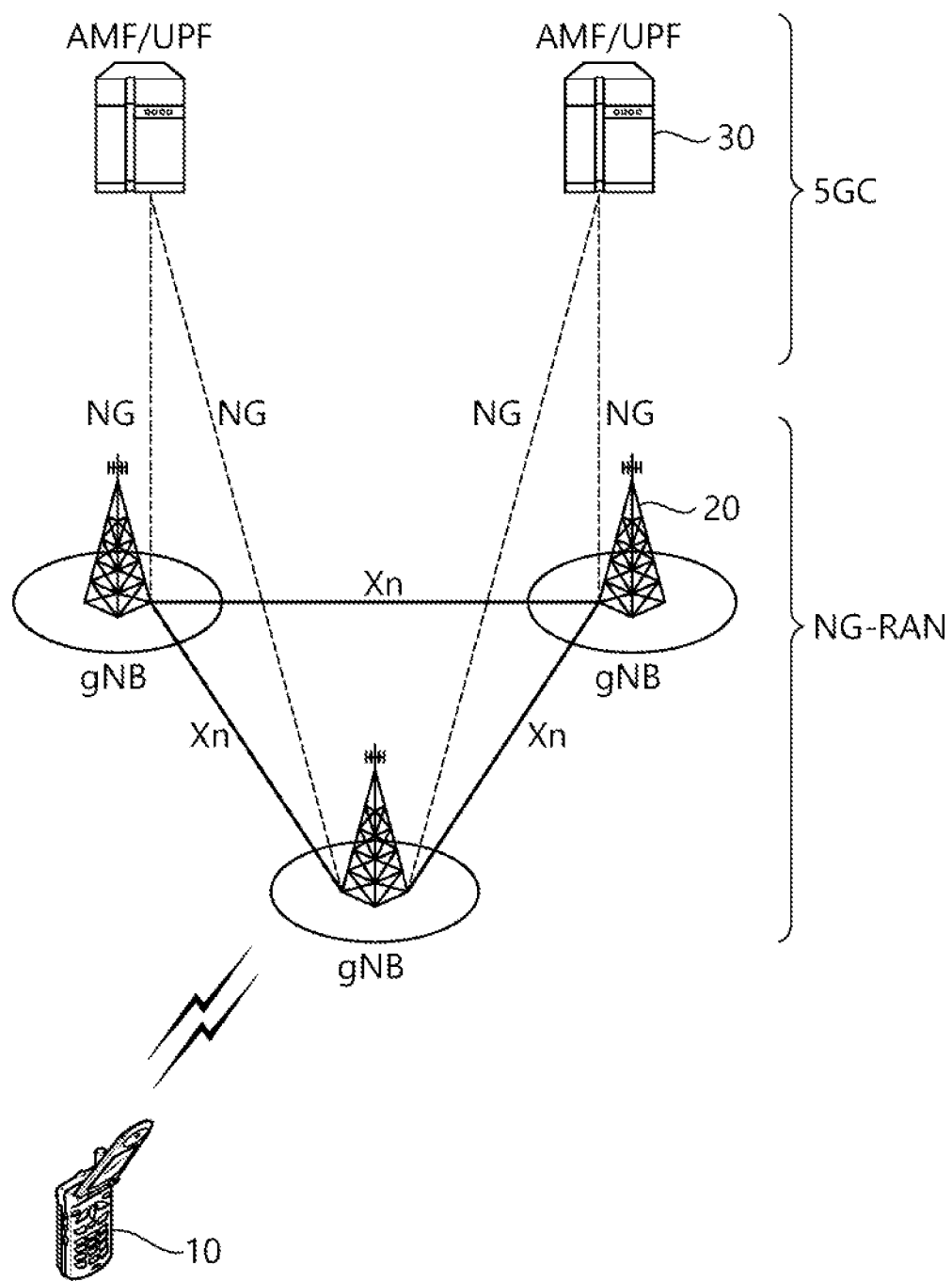
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the documents in Table 1 below may be referred to.

TABLE 1

| 3GPP LTE | 3GPP NR (e.g. 5G) |
|---|---|
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical | 3GPP TS 38.213: Physical |

TABLE 1-continued

| 3GPP LTE | 3GPP NR (e.g. 5G) |
| --- | --- |
| layer procedures | layer procedures for control |
| 3GPP TS 36.214: Physical layer; Measurements | 3 GPP TS 38.214: Physical layer procedures for data |
| 3GPP TS 36.300: Overall description | 3GPP TS 38.215: Physical laye rmeasurements |
| 3GPP TS 36.304: User Equipment (UE) procedures in idle mode | 3GPP TS 38.300: Overall description |
| 3GPP TS 36.314: Layer 2—Measurements | 3GPP TS 38.304: User Equipment (UE) procedures in idle mode and in RRC inactive state |
| 3GPP TS 36.321: Medium Access Control (MAC) protocol | 3GPP TS 38.321: Medium Access Control (MAC) protocol |
| 3GPP TS 36.322: Radio Link Control (RLC) protocol | 3GPP TS 38.322: Radio Link Control (RLC) protocol |
| 3GPP TS 36.323: Packet Data Convergence Protocol (PDCP) | 3GPP TS 38.323: Packet Data Convergence Protocol (PDCP) |
| 3GPP TS 36.331: Radio Resource Control (RRC) protocol | 3GPP TS 38.331: Radio Resource Control (RRC) protocol |
| | 3GPP TS 37.324: Service Data Adaptation Protocol (SDAP) |
| | 3GPP TS 37.340: Multi-connectivity; Overall description |

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
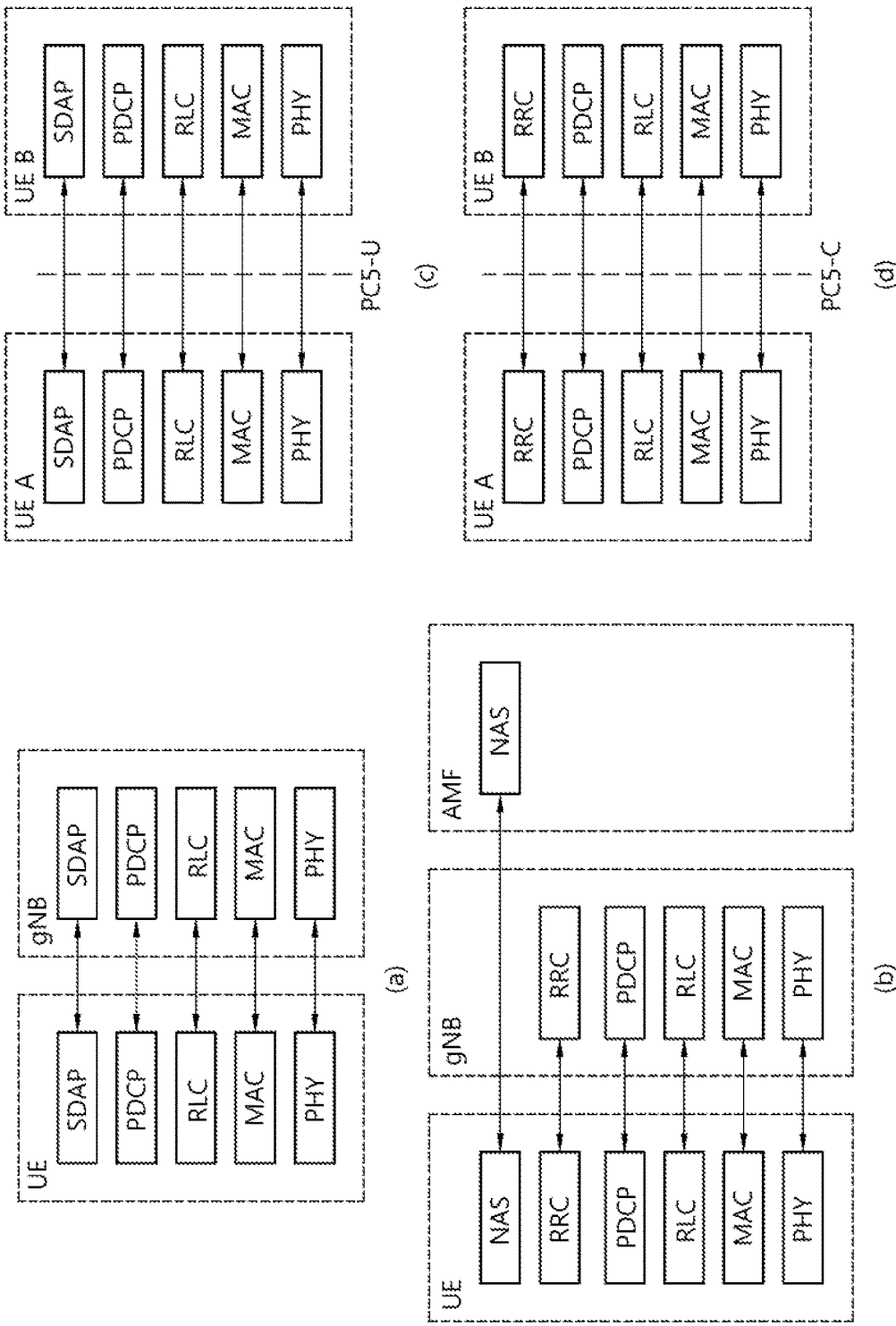
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
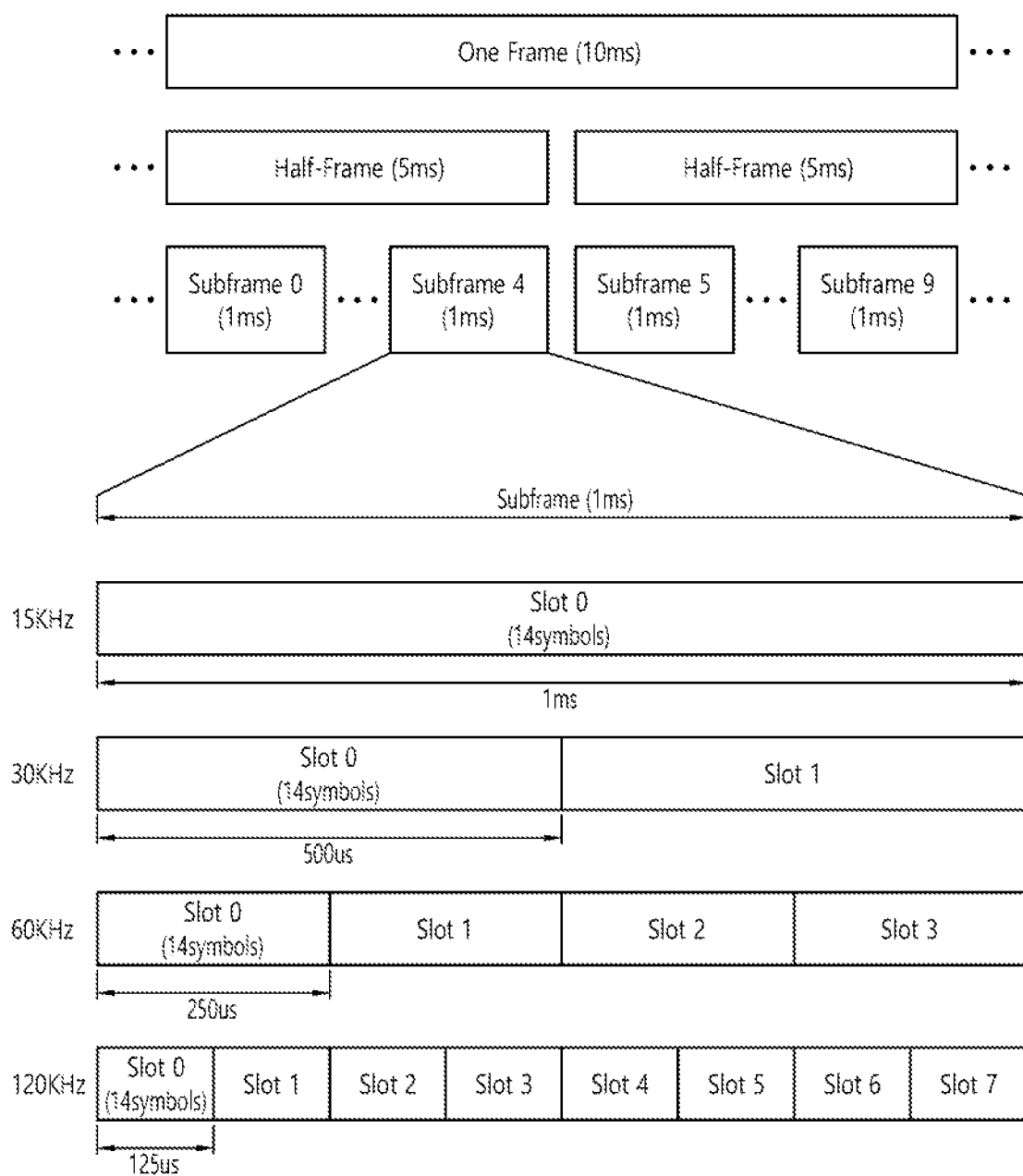
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 2 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 3 shows an example of a number of symbols per slot, a number of slots per frame, and a number of slots per subframe based on the SCS, in a case where an extended CP is used.

TABLE 3

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
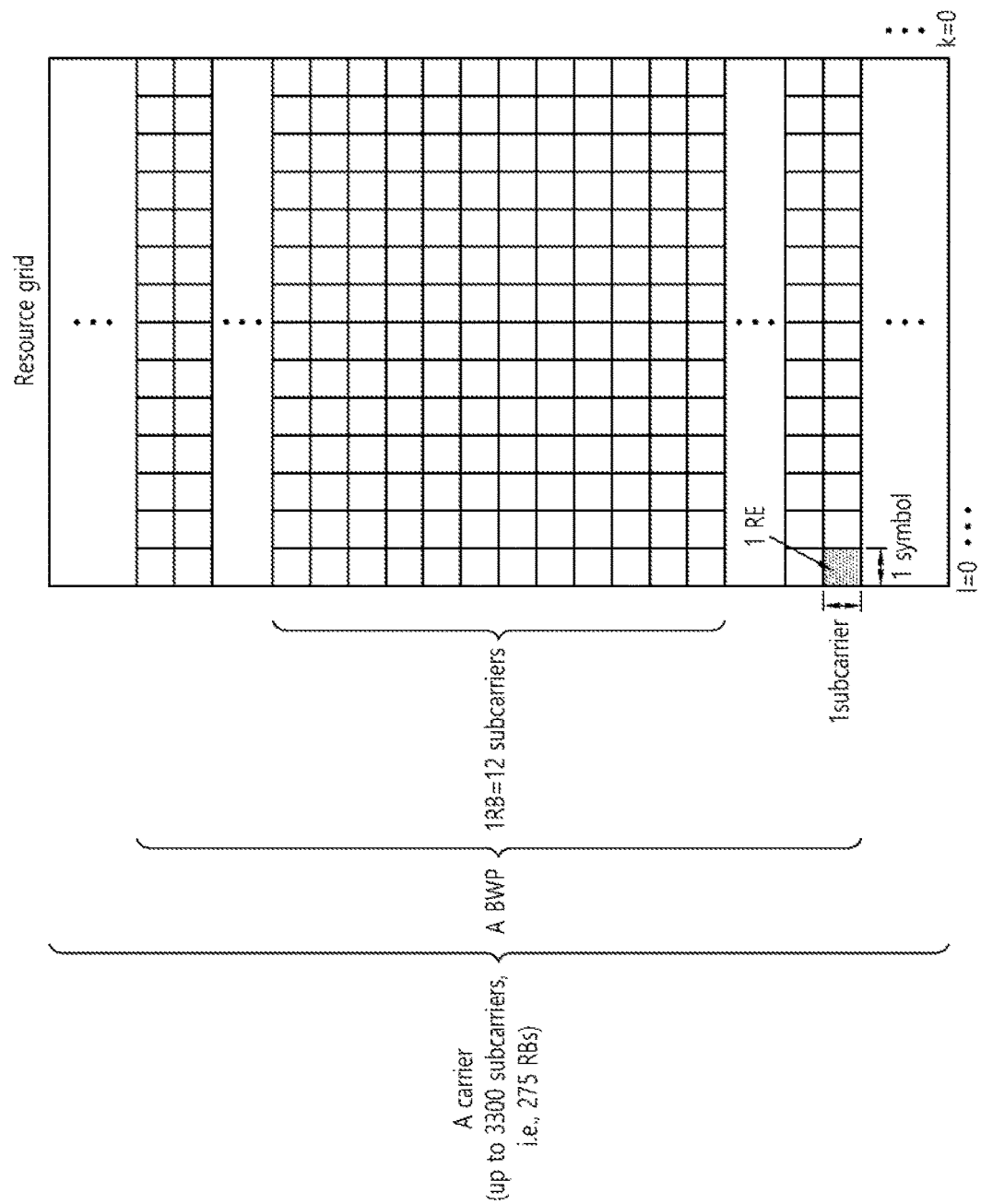
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRB s) for the given numerology on a given carrier.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
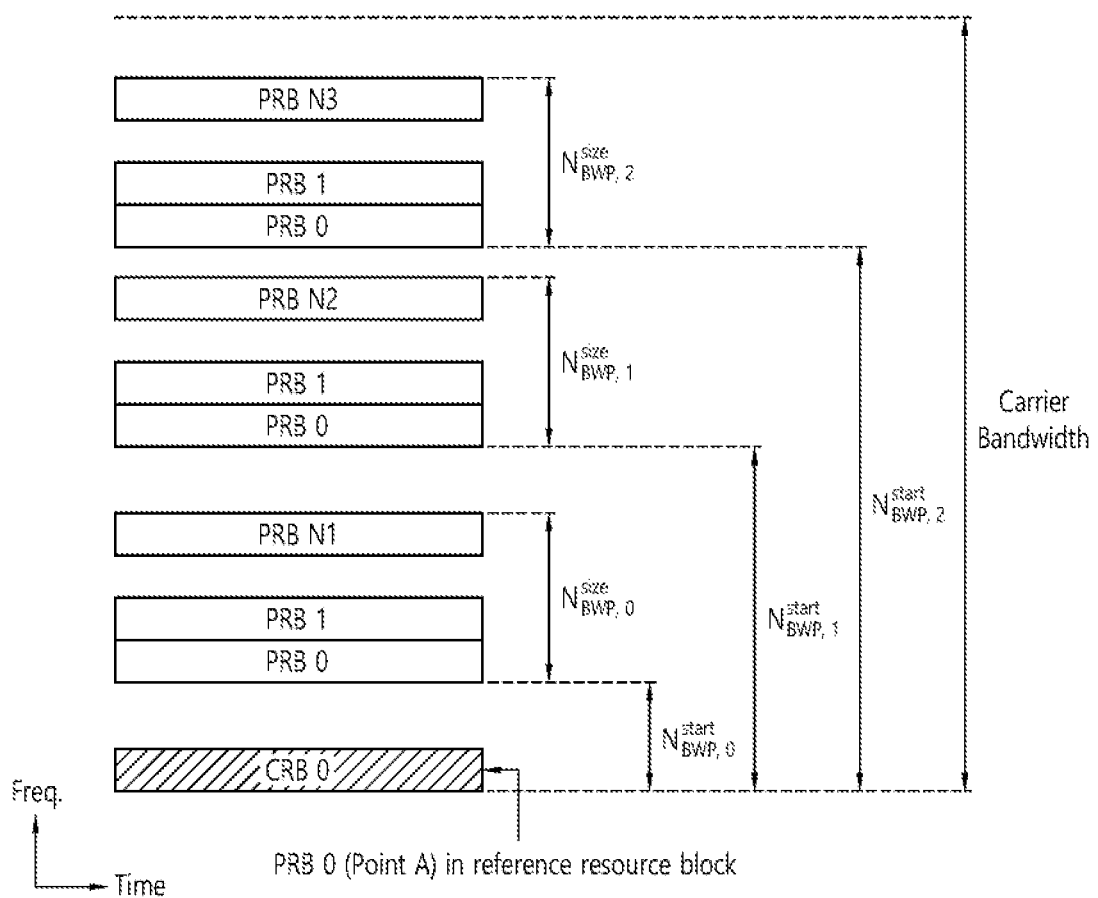
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
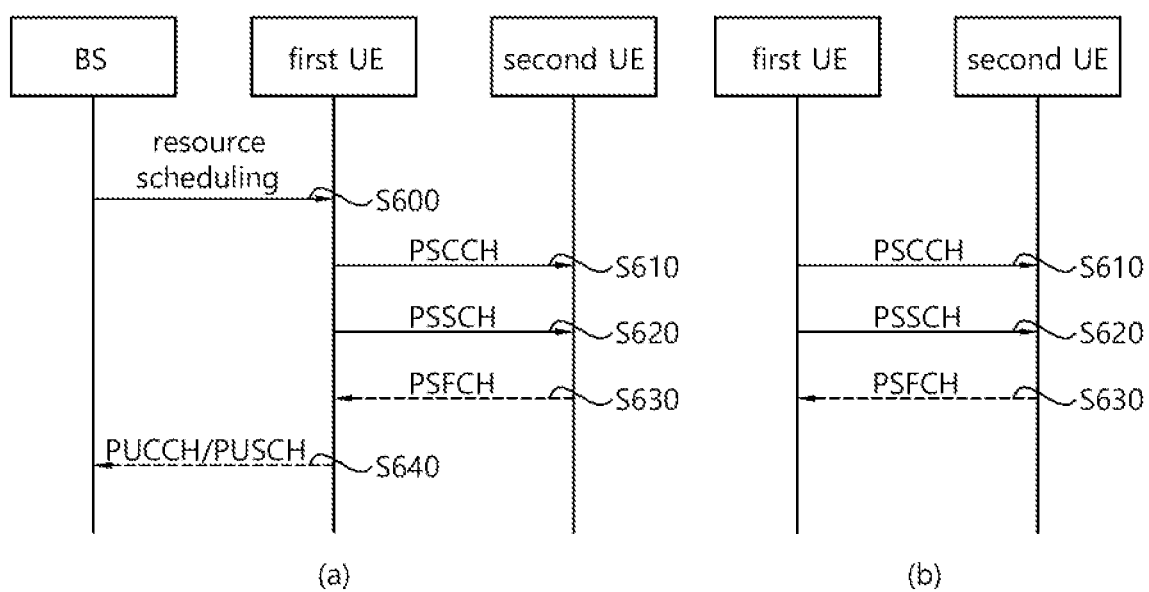
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Tables 6A-6B show an example of the $1^{st}$-stage SCI format.

TABLE 6A 8.3.1.1 SCI format 1-A

SCI format 1-A is used for the scheduling of PSSCH and $2^{nd}$-stage-SCI on PSSCH
The following information is transmitted by means of the SCI format 1-A:
  Priority—3 bits as specified in clause 5.4.3.3 of [12, TS 23.287] and clause 5.22.1.3.1 of [8, TS 38.321].

Frequency resource assignment— $\left\lceil \log_2\left(\frac{N^{SL}_{subChannel}(N^{SL}_{subChannel}+1)}{2}\right)\right\rceil$ bits when the value of the higher layer parameter sl-MaxNumPerReserve is configured to 2; otherwise $\left\lceil \log_2\left(\frac{N^{SL}_{subChannel}(N^{SL}_{subChannel}+1)(2N^{SL}_{subChannel}+1)}{6}\right)\right\rceil$ bits when the value of the higher layer parameter sl-MaxNumPerReserve is configured to 3, as defined in clause 8.1.2.2 of [6, TS 38.214].
Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 382.14].

TABLE 6A-continued 8.3.1.1 SCI format 1-A

Resource reservation period—[$\log_2 N_{rsv\_period}$] bits as defined in clause 8.14 of [6, TS 38.214], where $N_{rsv\_period}$ is the number of entries in the higher layer parameter sl-ResourceReservePeriodList, if higher layer parameter sl-MultiReserveResource is configured; 0 bit otherwise.
DMRS pattern—[$\log_2 N_{pattern}$] bits as defined in clause 8.4.1.1.2 of [4, TS 38.211], where $N_{pattern}$ is the number of DMRS patterns configured by higher layer parameter sl-PSSCH-DMRS-TimePatternList.
$2^{nd}$-stage SCI format—2 bits as defined in Table 8.3.1.1-1.
Beta_offset indicator—2 bits as provided by higher layer parameter sl-BetaOffsets2ndSCI and Table 8.3.1.1-2.
Number of DMRS port—1 bit as defined in Table 8.3.1.1-3.
Modulation and coding scheme—5 bits as defined in clause 8.1.3 of [6, TS 38.214].
Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.
PSFCH overhead indication—1 bit as defined clause 8.1.3.2 of [6, TS 38.214] if higher layer parameter sl-PSFCH-Period = 2 or 4; 0 bit otherwise.
Reserved—a number of bits as determined by higher layer parameter sl-NumReservedBits, with value set to zero.

TABLE 6B

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Tables 7A-7B show an example of the $2^{nd}$-stage SCI format.

TABLE 7A

| 8.4.1.1 | SCI format 2-A |
|---|---|

SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
HARQ process number—4 bits as defined in clause 16.4 of [5, TS 38.213].
New data indicator—1 bit as defined in clause 16.4 of [5, TS 38.213].
Redundancy version—2 bits as defined in clause 16.4 of [6, TS 38.214].
Source ID—8 bits as defined in clause 8.1 of [6, TS 38.214].
Destination ID—16 bits as defined in clause 8.1 of [6, TS 38.214].
HARQ feedback enabled/disabled indicator - 1 bit as defined in clause 16.3 of [5, TS 38.213].
Cast type indicator - 2 bits as defined in Table 8.4.1.1-1.
CSI request - 1 bit as defined in clause 8.2.1 of [6, TS 38.214].

| 8.4.1.2 | SCI format 2-B |
|---|---|

SCI format 2-B is used for the decoding of PSSCH, with HARQ operation when HARQ-ACK information includes only NACK, or when there is no feedback of HARQ-ACK information.
The following information is transmitted by means of the SCI format 2-B:
HARQ process number—4 bits as defined in clause 16.4 of [5, TS 38.213].
New data indicator—1 bit as defined in clause 16.4 of [5, TS 38.213].
Redundancy version—2 bits as defined in clause 16.4 of [6, TS 38.214].
Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Zone ID—12 bits as defined in clause 5.8.11 of [9, TS 38.331].
Communication range requirement—4 bits determined by higher layer parameter sl-ZoneConfigMCR-Index.

TABLE 7B

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
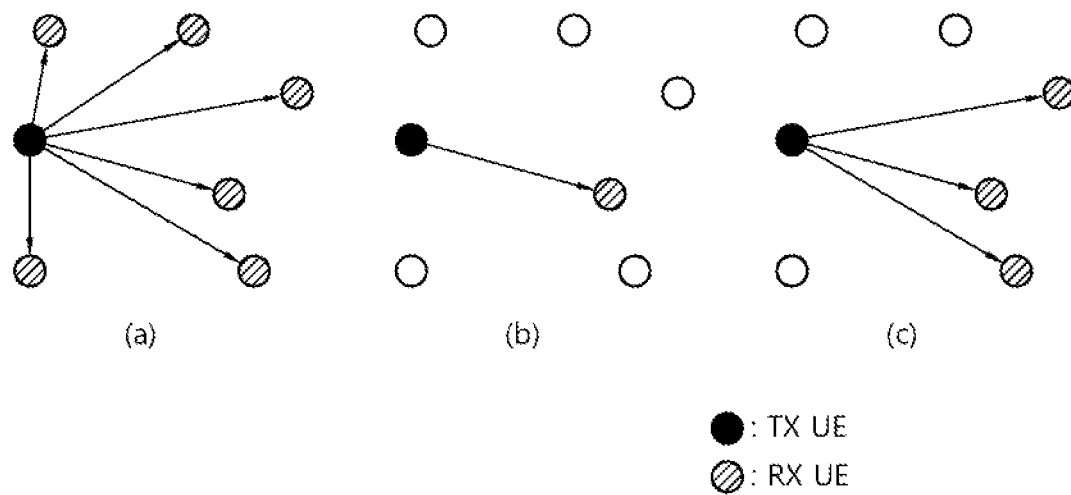
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, an inter-UE coordination operation may be supported in NR V2X. For example, in inter-UE coordination, a UE-A may determine a set of resources, and the UE-A may transmit the set to a UE-B in the resource allocation mode 2. In addition, the UE-B may consider the set for resource selection for its own transmission. For example, according to inter-UE coordination, the UE may inform other UEs of information related to preferred resource(s) or information related to non-preferred resource(s) (hereinafter, it is referred to as a candidate resource or a recommended resource) in the form of assistance information. For example, upon receiving information related to an excluding resource and/or a candidate resource, the UE may select its own transmission resource in consideration of the excluding resource and/or the candidate resource.

For example, in order to assist a sensing operation and/or a resource selection operation of a first UE, a second UE may transmit assistance information. The first UE may use the assistance information received from the second UE, in order to improve PSSCH detection performance and/or reduce half-duplex limit and/or select a reserve resource for transmitting and receiving a specific signal. In an embodiment of the present disclosure, for convenience of description, it is assumed that the UE-A transmits assistance information to the UE-B. It is assumed that the UE-B selects a resource for PSCCH/PSSCH to be transmitted to the UE-A and/or a resource for PSCCH/PSSCH to be transmitted to a UE-C (i.e., a third UE) based on the assistance information received from the UE-A.

Figure 8:
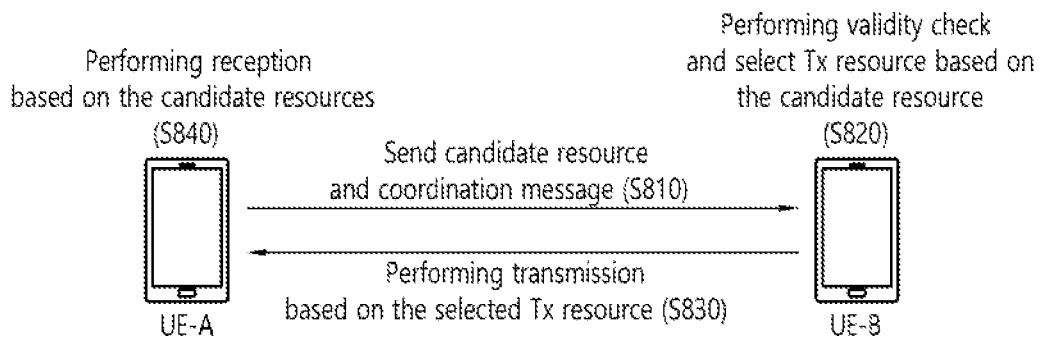
FIG. 8 shows a procedure for a UE-A to transmit assistance information to a UE-B, based on an embodiment of the present disclosure.

FIG. 8 shows a procedure for a UE-A to transmit assistance information to a UE-B, based on an embodiment of the present disclosure. The embodiment of FIG. 8 may be combined with various embodiments of the present disclosure.

Referring to FIG. 8, in step S810, the UE-A may transmit assistance information to the UE-B. In step S820, the UE-B may select a resource for PSCCH/PSSCH based on the assistance information received from the UE-A. In step S830, the UE-B may perform SL transmission by using the resource. For example, the UE-B may select a resource for PSCCH/PSSCH to be transmitted to the UE-A based on the assistance information received from the UE-A, and the UE-B may perform SL transmission by using the resource. For example, the UE-B may select a resource for PSCCH/PSSCH to be transmitted to the UE-C based on the assistance information received from the UE-A, and the UE-B may perform SL transmission by using the resource. In step S840, the UE-A or the UE-C may perform SL reception on the resource determined based on the assistance information.

As described above, the UE-A may transmit information related to recommended resource(s) and/or candidate resource(s) to the UE-B, and the UE-B may select a transmission resource based on the received resource information. In this situation, in case that the UE-A transmits information related to excluding resource(s) and/or candidate resource(s) based on a coordination message, a method for efficiently transmitting the corresponding information and a device supporting the same may be required. For example, if the UE-A frequently transmits an inter-UE coordination message, the use of resources for the transmission may increase, and thus interference may occur. Furthermore, power consumption of the UE-A for the transmission may also occur. Furthermore, since the UE-A cannot perform reception while the UE-A transmits a message (due to a half-duplex problem), a problem in which reception efficiency of the UE-A deteriorates may occur. In the present disclosure, an efficient operation of the UE is defined based on this problem. In the present disclosure, the coordination message may be referred to by various terms such as an inter-UE coordination message, inter-UE coordination information, assistance information, a candidate message, etc.

Based on various embodiments of the present disclosure, a method for the UE-A and the UE-B to perform SL communication based on assistance information and a device supporting the same are proposed.

Based on an embodiment of the present disclosure, the UE-A may transmit an inter-UE coordination message for inter-UE coordination. For example, the message may include the following two types of information (e.g., excluding resource(s) and/or candidate resource(s)). For example, the UE-A may transmit the inter-UE coordination message to the UE-B through a physical layer signal or a higher layer signal. Herein, for example, for excluding resource(s) and/or candidate resource(s), resources may be configured separately. Or, for example, excluding resource(s) and/or candidate resource(s) may be configured by one resource (indication). If the resources are configured separately, information representing whether an indicated resource is an excluding resource or a candidate resource may be included/transmitted. Or, for example, whether an indicated resource is an excluding resource or a candidate resource may be recognized through information itself.

Case 1) By recommending excluding transmission resource(s) to the UE-B, the UE-B performs transmission by selecting other transmission resources except for the excluding resource(s) (based on sensing or based on random selection), and/or Case 2) By recommending selection of transmission resource(s) to the UE-B, the UE-B performs transmission by selecting a transmission resource included in the candidate resource(s) (based on sensing or based on random selection)

Based on an embodiment of the present disclosure, after the UE-A knows that the UE-B performs power saving (in unicast) (through a PC5 connection) or after the UE-B notifies the UE-A to perform a power saving operation, all or partial resource information of the UE-B may be transmitted. In this case, the UE-A may perform the following procedure.

The UE-A may transmit all or partial sensing results of the UE-A to the UE-B through an inter-UE coordination message together with information related to excluding resource(s) and/or candidate resource(s).

Based on an embodiment of the present disclosure, when the UE-A performs transmission based on groupcast or broadcast (in groupcast or broadcast), if the UE-A determines that receiving UEs need to perform a power saving operation, the UE-A may perform the following operation.

If channel information of the UE-A and the receiving UEs is similar and sensing results are not different from each other, the UE-A may transmit all or partial sensing results of the UE-A together with information related to excluding resource(s) and/or candidate resource(s) through an inter-UE coordination message.

For example, in the procedure in which the UE-A transmits the aforementioned inter-UE coordination message, if inter-UE coordination information transmitted by neighboring UEs is the same as information to be transmitted by the UE-A, the UE-A may save power by skipping (periodic or event-based) transmission.

Figure 9:
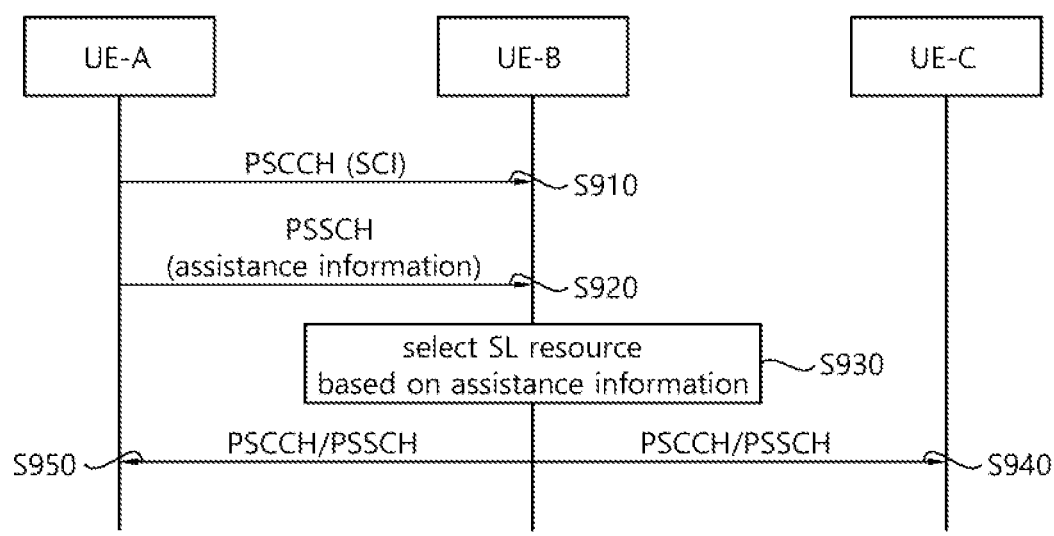
FIG. 9 shows a procedure for a UE to perform SL communication based on assistance information, based on an embodiment of the present disclosure.

FIG. 9 shows a procedure for a UE to perform SL communication based on assistance information, based on an embodiment of the present disclosure. The embodiment of FIG. 9 may be combined with various embodiments of the present disclosure.

Referring to FIG. 9, in step S910, the UE-B may receive SCI from the UE-A through a PSCCH. For example, the SCI may include information for scheduling a PSSCH. In step S920, the UE-B may receive assistance information from the UE-A through the PSSCH. For example, the assistance information may be included in a MAC PDU. For example, the assistance information may include information proposed in various embodiments of the present disclosure. In step S930, the UE-B may select an SL resource based on the assistance information.

In step S940, the UE-B may transmit a PSCCH and/or a PSSCH to the UE-C based on the selected SL resource. Alternatively/additionally, in step S950, the UE-B may transmit a PSCCH and/or a PSSCH to the UE-A based on the selected SL resource.

For example, first SCI transmitted in step S910 may include information representing that the assistance information is transmitted through the PSSCH in step S920. For example, the information representing that the assistance information is transmitted through the PSSCH may be transmitted based on a reserved bit included in the first SCI. For example, the information representing that the assistance information is transmitted through the PSSCH may be information related to a second SCI format included in the first SCI. Specifically, for example, second SCI having a specific format among a plurality of second SCI formats may be used to schedule transmission of assistance information.

For example, the second SCI transmitted in step S920 may include information representing that the assistance information is transmitted through the PSSCH in step S920.

Figure 10:
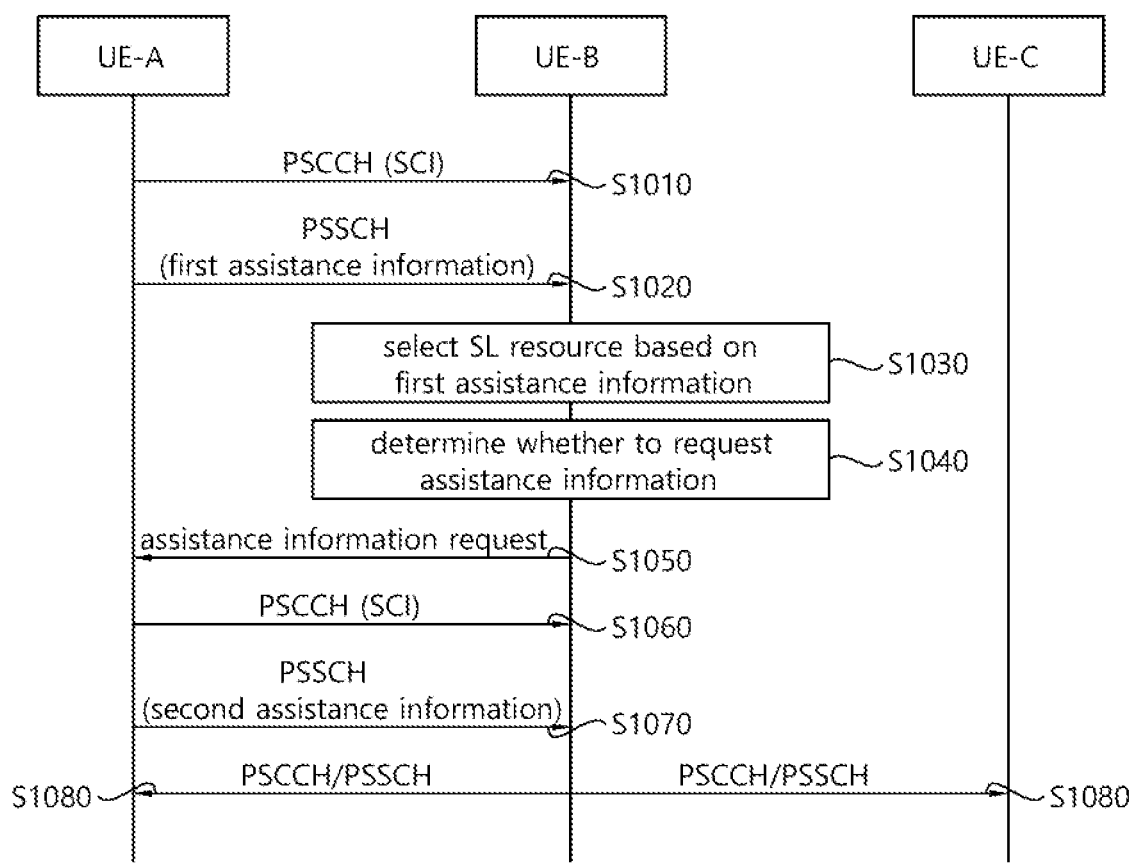
FIG. 10 shows a procedure for a UE to perform SL communication based on assistance information, based on an embodiment of the present disclosure.

FIG. 10 shows a procedure for a UE to perform SL communication based on assistance information, based on an embodiment of the present disclosure. The embodiment of FIG. 10 may be combined with various embodiments of the present disclosure.

Referring to FIG. 10, in step S1010, the UE-A may transmit SCI to the UE-B through a PSCCH. For example, the SCI may include information for scheduling a PSSCH.

In step S1020, the UE-A may transmit first assistance information to the UE-B through a PSSCH. For example, the first assistance information may be included in a MAC PDU. For example, the first assistance information may include information proposed in various embodiments of the present disclosure. For example, the first assistance information may include information related to excluding resource(s) and/or candidate resource(s). For example, the candidate resource may be a resource which is preferred by the UE-A. For example, the excluding resource may be a resource which is not preferred by the UE-A. For example, the candidate resource may be a resource which is preferred by the UE-C. For example, the excluding resource may be a resource which is not preferred by the UE-C. For example, the UE-B may receive information related to resource(s) preferred by other UEs (i.e., candidate resource(s)) and/or information related to resource(s) not preferred by other UEs (i.e., excluding resource(s)) from the UE-A.

In step S1030, the UE-B may select an SL resource based on the first assistance information. For example, in case that the UE-B operates in a power saving mode, the UE-B that has received the inter-UE coordination message may perform the following operation.

The UE-B may not perform a full (or partial) sensing operation based on sensing results transmitted by the UE-A. Instead, the UE-B may configure transmission resource(s) based on the sensing results transmitted by the UE-A.

In step S1040, the UE-B may determine whether to request assistance information. For example, the UE-B may determine whether to request additional assistance information. For example, if resource reselection is performed after the UE-B receives the inter-UE coordination message, step S1050 may be performed.

In step S1050, the UE-B may inform that resource reselection has been performed. For example, the UE-B may request (re)transmission of an inter-UE coordination message. For example, the UE-B may transmit information for requesting (re)transmission of an inter-UE coordination message to the UE-A.

For example, if the UE-A receives the request from the UE-B or resource reselection is performed, the UE-A may perform the following procedure.

If the information related to excluding resource(s) and/or candidate resource(s) (or the sensing result) transmitted by the UE-A is the same, the UE-A may skip (periodic or event-based) retransmission. In this case, for example, steps S1060 and S1070 may be skipped.

If the information related to excluding resource(s) and/or candidate resource(s) (or the sensing result) transmitted by the UE-A is not the same, the UE-A may perform (periodic or event-based) retransmission. In this case, for example, in step S1060, the UE-A may transmit SCI to the UE-B through a PSCCH. For example, the SCI may include information for scheduling a PSSCH. In step S1070, the UE-A may transmit second assistance information to the UE-B through the PSSCH. For example, the second assistance information may be included in a MAC PDU. For example, the second assistance information may include information proposed in various embodiments of the present disclosure. For example, the second assistance information may include information related to excluding resource(s) and/or candidate resource(s). For example, the candidate resource may be a resource which is preferred by the UE-A. For example, the excluding resource may be a resource which is not preferred by the UE-A. For example, the candidate resource may be a resource which is preferred by the UE-C. For example, the excluding resource may be a resource which is not preferred by the UE-C. For example, the UE-B may receive information related to resource(s) preferred by other UEs (i.e., candidate resource(s)) and/or information related to resource(s) not preferred by other UEs (i.e., excluding resource(s)) from the UE-A.

In step S1080, the UE-B may select an SL resource based on the first assistance information and/or the second assistance information. In addition, the UE-B may transmit a PSCCH and/or a PSSCH to the UE-A or the UE-C based on the SL resource.

Meanwhile, the proposed inter-UE coordination message may be a message including coordination information (e.g., resource information, channel state information, etc.) to be newly applied by the counterpart UE which has received the message. For example, the inter-UE coordination message may be a PC5 RRC message. In this case, the inter-UE coordination message may be transmitted through PC5 RRC signaling. For example, the inter-UE coordination message may be a MAC CE message. In this case, the inter-UE coordination message may be transmitted through a MAC CE. Accordingly, the inter-UE coordination message may have an SL priority different from that of a PC5 RRC message, a MAC CE message, and/or SL data for other purposes used in SL communication.

As described above, an inter-UE coordination message may be transmitted by being included in a medium access control (MAC) service data unit (SDU) or a MAC control element (CE) within a MAC protocol data unit (PDU). For example, in case that the inter-UE coordination message is included in the MAC CE, since the MAC CE does not have a mapping logical channel (e.g., sidelink traffic channel (STCH), sidelink control channel (SCCH)), a problem in which a priority of the MAC CE is ambiguous may occur when the UE includes the MAC CE for the inter-UE coordination message in the MAC PDU based on a logical channel prioritization (LCP) procedure. For example, in case that the inter-UE coordination message is included in the MAC SDU, since a logical channel (e.g., sidelink traffic channel (STCH), sidelink control channel (SCCH)) to which the inter-UE coordination message is mapped is not currently defined, a problem in which a priority of the MAC SDU is ambiguous may occur when the UE includes the MAC SDU for the inter-UE coordination message in the MAC PDU based on a logical channel prioritization (LCP) procedure. As described above, if a priority related to the inter-UE coordination message is not clearly defined, the UE cannot perform the LCP procedure for generating the MAC PDU.

Furthermore, if the UE-A transmits an inter-UE coordination message to the UE-B, the UE-B may not be able to distinguish whether the message transmitted by the UE-A is an inter-UE coordination message or a general data/message. Since an inter-UE coordination message is information considered for efficiently selecting SL resources, the UE-B needs to quickly recognize that the message transmitted by the UE-A is an inter-UE coordination message.

Therefore, based on various embodiments of the present disclosure, when UEs transmit the inter-UE coordination message to perform an inter-UE coordination operation in NR V2X communication, the inter-UE coordination message may have a different priority from other sidelink messages (e.g., PC5 RRC message, MAC CE, and SL data). To this end, a method of newly defining a logical channel (LCH) priority of an inter-UE coordination message and performing sidelink logical channel prioritization (SL LCP) based on the newly defined LCH priority of the inter-UE coordination message, and device(s) supporting the same are proposed. Hereinafter, an SL LCH priority and an LCP operation method of an inter-UE coordination message will be described in detail.

In the present disclosure, for an LCP operation of the UE (e.g., MAC entity) for an inter-UE coordination message, an SL priority (or SL LCH priority) of the inter-UE coordination message may be defined as follows.

For example, the SL priority of the inter-UE coordination message may be defined as shown in Table 8. For example, priorities may be described in following order, with the highest priority listed first. That is, in the embodiment of Table 8, data from SCCH may have the highest priority. For example, in the embodiment of Table 8, it is assumed that an inter-UE coordination message is transmitted through a MAC CE (i.e., by being included in the MAC CE).

TABLE 8 data from SCCH (e.g., PC5-S message, PC5 RRC message)
SL CSI reporting MAC CE
Inter-UE coordination MAC CE
data from any STCH (e.g., sidelink user data)

For example, an SL priority of an inter-UE coordination message may be defined as shown in Table 9. For example, priorities may be described in following order, with the highest priority listed first. That is, in the embodiment of Table 9, data from SCCH may have the highest priority. For example, in the embodiment of Table 9, it is assumed that an inter-UE coordination message is transmitted through a MAC CE (i.e., by being included in the MAC CE).

TABLE 9 data from SCCH (e.g., PC5-S message, PC5 RRC message)
Inter-UE coordination MAC CE
SL CSI reporting MAC CE
data from any STCH (e.g., sidelink user data)

For example, an SL priority of an inter-UE coordination message may be defined as shown in Table 10. For example, priorities may be described in following order, with the highest priority listed first. That is, in the embodiment of Table 10, data from SCCH may have the highest priority. For example, in the embodiment of Table 10, it is assumed that an inter-UE coordination message is transmitted through PC5 RRC signaling (i.e., by being included in a PC5 RRC message).

TABLE 10 data from SCCH (e.g., PC5-S message, PC5 RRC message, inter-UE coordination message)
SL CSI reporting MAC CE
data from any STCH (e.g., sidelink user data)

Based on an embodiment of the present disclosure, the UE may perform an LCP operation as follows based on an LCH priority of an inter-UE coordination message proposed above. For example, if the UE (e.g., MAC entity) has at least one MAC SDU and at least one MAC CE for new transmission, the UE may generate a MAC PDU by selecting MAC SDUs or MAC CEs in the order of destinations having the highest LCH priority (i.e., based on/according to the descending order of the SL LCH priorities). For example, if the UE (e.g., MAC entity) has at least one MAC SDU and at least one MAC CE as below, the UE may perform an LCP operation (e.g., an operation of generating a MAC PDU) based on an LCH priority of an inter-UE coordination message proposed in the present disclosure as follows.

(1) Embodiment 1

It is assumed that the UE (e.g., MAC entity) has at least one MAC SDU and at least one MAC CE as follows. The highest priority may be listed first.

data from SCCH (e.g., PC5-S message, PC5 RRC message)
Inter-UE coordination MAC CE message
SL CSI reporting MAC CE Based on an SL priority (or an SL LCH priority) of an inter-UE coordination MAC CE message proposed in the present disclosure, the UE (e.g., MAC entity) may first fill a MAC PDU with an SDU for data from SCCH. If space remains in the MAC PDU even after filling the SDU for data from SCCH into the MAC PDU, the UE (e.g., MAC entity) may fill the MAC PDU in the order of an inter-UE coordination MAC CE message and an SL CSI reporting MAC CE. If one MAC PDU cannot be filled with both the MAC SDU and the MAC CE (i.e., data from SCCH, inter-UE coordination MAC CE message, SL CSI reporting MAC CE), the UE may fill the MAC PDU with the MAC SDU and the MAC CE in the order of SL priorities proposed in the present disclosure.

Embodiment 1 is an embodiment for a case where an SL priority of an inter-UE coordination MAC CE message is higher than an SL priority of an SL CSI reporting MAC CE. If the proposal configuring the SL priority of the SL CSI reporting MAC CE higher than the SL priority of the inter-UE coordination MAC CE message is applied, when the UE (e.g., MAC entity) generates a MAC PDU, the UE may generate the MAC PDU by first including the SL CSI reporting MAC CE in the MAC PDU rather than the inter-UE coordination MAC CE message.

(2) Embodiment 2

It is assumed that the UE (e.g., MAC entity) has at least one MAC SDU and at least one MAC CE as follows. The highest priority may be listed first.
  Inter-UE coordination MAC CE message
  SL CSI reporting MAC CE
  data from STCH (e.g., sidelink user data)

Based on an SL priority (or an SL LCH priority) of an inter-UE coordination MAC CE message proposed in the present disclosure, the UE (e.g., MAC entity) may first fill a MAC PDU with an inter-UE coordination MAC CE message. If space remains in the MAC PDU even after filling the MAC CE message in the MAC PDU, the UE (e.g., MAC entity) may fill the MAC PDU in the order of an SL CSI reporting MAC CE and a MAC SDU for data from STCH. If one MAC PDU cannot be filled with both the MAC CE and the MAC SDU (i.e., inter-UE coordination MAC CE message, SL CSI reporting MAC CE, data from STCH), the UE may fill the MAC PDU with the MAC CE and the MAC SDU in the order of SL priorities proposed in the present disclosure.

Embodiment 2 is an embodiment for a case where an SL priority of an inter-UE coordination MAC CE message is higher than an SL priority of an SL CSI reporting MAC CE. If the proposal configuring the SL priority of the SL CSI reporting MAC CE higher than the SL priority of the inter-UE coordination MAC CE message is applied, when the UE (e.g., MAC entity) generates a MAC PDU, the UE may generate the MAC PDU by first including the SL CSI reporting MAC CE in the MAC PDU rather than the inter-UE coordination MAC CE message.

(3) Embodiment 3

It is assumed that the UE (e.g., MAC entity) has at least one MAC SDU and at least one MAC CE as follows. The highest priority may be listed first.
  data from SCCH (e.g., PC5-S message, PC5 RRC message, inter-UE coordination message), where it is assumed that the inter-UE coordination message is transmitted through a PC5 RRC message
  SL CSI reporting MAC CE
  data from any STCH (e.g., sidelink user data)

Based on an SL priority (or an SL LCH priority) of an inter-UE coordination PC5 RRC message proposed in the present disclosure, the UE (e.g., MAC entity) may first fill a MAC PDU with an SDU for data from SCCH. If space remains in the MAC PDU even after filling the SDU for data from SCCH into the MAC PDU, the UE (e.g., MAC entity) may fill the MAC PDU in the order of an SL CSI reporting MAC CE and data from any STCH. If one MAC PDU cannot be filled with both the MAC SDU and the MAC CE (i.e., data from SCCH including inter-UE coordination PC5 RRC message, SL CSI reporting MAC CE, data from any STCH), the UE may fill the MAC PDU with the MAC SDU and the MAC CE in the order of SL priorities proposed in the present disclosure.

In addition, based on the SL priority value of the inter-UE coordination message proposed in the present disclosure, the UE may perform UL/SL prioritization (e.g., an operation of determining transmission priority when the UE needs to simultaneously perform uplink transmission and sidelink transmission).

Based on an embodiment of the present disclosure, in case that the UE transmits an inter-UE coordination message, a destination layer 2 ID included in a MAC header may be newly proposed. For example, an independent layer 2 ID for distinguishing transmission of the inter-UE coordination message only may be newly defined. For example, according to the prior art, a destination layer 2 ID for a broadcast message, a destination layer 2 ID for a groupcast message, and a destination layer 2 ID for a unicast message are separately defined. Also, according to the prior art, when multiplexing a MAC PDU, multiplexing (MUX) is supported only for the same cast type. That is, unicast data/messages may only be multiplexed with unicast data/messages, and groupcast data/messages may only be multiplexed with groupcast data/messages, and broadcast data/messages may only be multiplexed with broadcast data/messages. In the present disclosure, an independent destination layer 2 ID only for the inter-UE coordination message may be defined. That is, based on an embodiment of the present disclosure, when the UE (e.g., MAC entity) performs multiplexing of a MAC PDU, the UE may perform multiplexing only for inter-UE coordination messages. That is, other MAC PDUs other than the inter-UE coordination message and the inter-UE coordination message may not be multiplexed into the same MAC PDU. In addition, an independent destination layer 2 ID only for the inter-UE coordination message may be a common destination layer 2 ID regardless of broadcast/groupcast/unicast. For example, the UE may perform broadcast/groupcast/unicast by using a common destination layer 2 ID. Or, an independent destination layer 2 ID only for the inter-UE coordination message may be defined as an individual destination layer 2 ID separately divided into broadcast/groupcast/unicast. That is, for example, in order to transmit the inter-UE coordination message in unicast, the UE may use a unicast destination layer 2 ID for the inter-UE coordination message. For example, in order to transmit the inter-UE coordination message in groupcast, the UE may use a groupcast destination layer 2 ID for the inter-UE coordination message. For example, in order to transmit the inter-UE coordination message in broadcast, the UE may use a broadcast destination layer 2 ID for the inter-UE coordination message.

Based on an embodiment of the present disclosure, the UE may transmit an inter-UE coordination message by using a unicast destination layer 2 ID, a groupcast destination layer 2 ID, or a broadcast layer 2 ID equally used in the prior art (e.g., release 16 NR V2X). Meanwhile, if the UE transmits an inter-UE coordination message by using a conventional destination layer 2 ID (for unicast/groupcast/broadcast), the UE which has received the corresponding message cannot distinguish whether the message is an inter-UE coordination message or not. Therefore, based on an embodiment of the present disclosure, an identifier for identification may be included in SCI to indicate that a PSSCH associated with the corresponding SCI is an inter-UE coordination message. For example, the transmitting UE which transmits an inter-UE coordination message may indicate/inform the receiving UE that an inter-UE coordination message is transmitted through a PSSCH related to SCI, by using the SCI. Through this, even if the transmitting UE transmits an inter-UE coordination message by using a unicast destination layer 2 ID, a groupcast destination layer 2 ID, or a broadcast layer 2 ID equally used in the prior art (e.g., release 16 NR V2X), the receiving UE which has received the message can distinguish that the corresponding message is an inter-UE coordination message based on the SCI.

For example, the SCI may be first SCI transmitted through a PSCCH. For example, the SCI may be second SCI transmitted through a PSCCH. For example, transmission of an inter-UE coordination message may be explicitly indicated by the SCI. That is, the SCI may include information indicating transmission of the inter-UE coordination message. Alternatively, for example, transmission of the inter-UE coordination message may be implicitly indicated by the SCI. For example, based on the format information of the second SCI included in the first SCI, transmission of the inter-UE coordination message may be implicitly indicated by the first SCI. In this case, the format of the second SCI for the inter-UE coordination message may be configured/defined separately.

Based on various embodiments of the present disclosure, in case that the UE (e.g., MAC entity) has at least one MAC CE, at least one MAC SDU, and at least one inter-UE coordination MAC CE message to be transmitted to destination UEs, the UE (e.g., MAC entity) can select the destination SDU or the destination MAC CE having the highest LCH priority based on the SL priority (or SL LCH priority) order proposed in the present disclosure, the UE can generate a MAC PDU based on this. Furthermore, the receiving UE can efficiently identify and receive an inter-UE coordination message.

Whether or not the (some) proposed method/rule of the present disclosure is applied or not and/or the related parameter (e.g., threshold) may be configured specifically (or differently or independently) based on a resource pool, a congestion level, a service priority (and/or type), a requirement (e.g., latency, reliability), a traffic type (e.g., (a)periodic generation), an SL mode, etc.

Figure 11:
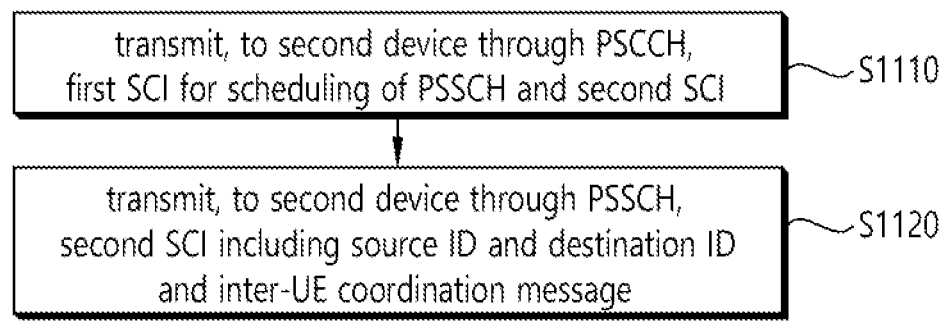
FIG. 11 shows a method for performing wireless communication by a first device, based on an embodiment of the present disclosure.

FIG. 11 shows a method for performing wireless communication by a first device, based on an embodiment of the present disclosure. The embodiment of FIG. 11 may be combined with various embodiments of the present disclosure.

Referring to FIG. 11, in step S1110, the first device may transmit, to a second device through a physical sidelink control channel (PSCCH), first sidelink control information (SCI) for scheduling of a physical sidelink shared channel (PSSCH) and second SCI. For example, the first SCI may include information related to frequency resource assignment, information related to time resource assignment and information related to a format of the second SCI. In step S1120, the first device may transmit, to the second device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Additionally, for example, the first device may generate, based on logical channel prioritization (LCP), a medium access control (MAC) protocol data unit (PDU) including the inter-UE coordination message.

For example, the inter-UE coordination message may be included in a MAC control element (CE) for the inter-UE coordination message in the MAC PDU. For example, a priority of the MAC CE for the inter-UE coordination message may be lower than a priority of data from a sidelink control channel (SCCH) and higher than a priority of data from a sidelink traffic channel (STCH). For example, the priority of the MAC CE for the inter-UE coordination message may be lower than a priority of a MAC CE for sidelink (SL) channel state information (CSI) reporting. For example, the priority of the MAC CE for the inter-UE coordination message may be higher than a priority of a MAC CE for sidelink (SL) channel state information (CSI) reporting.

For example, the inter-UE coordination message may be included in a MAC service data unit (SDU) for the inter-UE coordination message in the MAC PDU. For example, a priority of the inter-UE coordination message may be a priority of data from a sidelink control channel (SCCH). For example, a priority of the inter-UE coordination message may be higher than a priority of a MAC control element (CE) for sidelink (SL) channel state information (CSI) reporting and higher than a priority of data from a sidelink traffic channel (STCH).

For example, the information included in the first SCI may represent that the inter-UE coordination message is transmitted through the PSSCH.

For example, the information included in the second SCI may represent that the inter-UE coordination message is transmitted through the PSSCH.

For example, the information related to the format of the second SCI may represent a format of the second SCI related to the inter-UE coordination message.

For example, the destination ID may represent that the inter-UE coordination message is transmitted.

The proposed method can be applied to the device(s) based on various embodiments of the present disclosure. First, the processor 102 of the first device 100 may control the transceiver 106 to transmit, to a second device through a physical sidelink control channel (PSCCH), first sidelink control information (SCI) for scheduling of a physical sidelink shared channel (PSSCH) and second SCI. For example, the first SCI may include information related to frequency resource assignment, information related to time resource assignment and information related to a format of the second SCI. In addition, the processor 102 of the first device 100 may control the transceiver 106 to transmit, to the second device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and transmit, to the second device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: transmit, to a second UE through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and transmit, to the second UE through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Based on an embodiment of the present disclosure, a non-transitory computer-readable storage medium storing instructions may be provided. For example, the instructions, when executed, may cause a first device to: transmit, to a second device through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and transmit, to the second device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Figure 12:
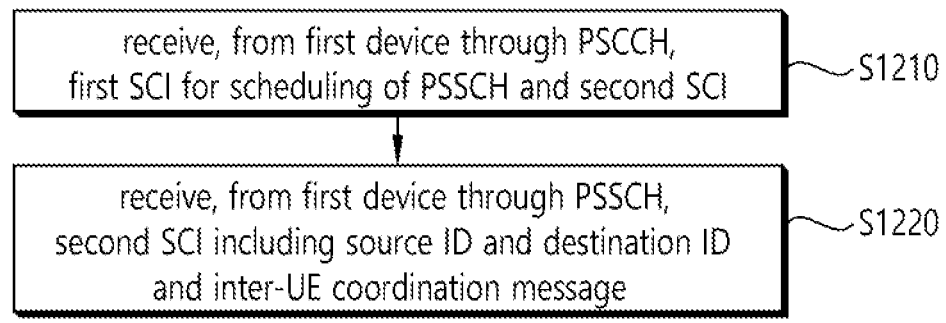
FIG. 12 shows a method for performing wireless communication by a second device, based on an embodiment of the present disclosure.

FIG. 12 shows a method for performing wireless communication by a second device, based on an embodiment of the present disclosure. The embodiment of FIG. 12 may be combined with various embodiments of the present disclosure.

Referring to FIG. 12, in step S1210, the second device may receive, from a first device through a physical sidelink control channel (PSCCH), first sidelink control information (SCI) for scheduling of a physical sidelink shared channel (PSSCH) and second SCI. For example, the first SCI may include information related to frequency resource assignment, information related to time resource assignment and information related to a format of the second SCI. In step S1220, the second device may receive, from the first device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

The proposed method can be applied to the device(s) based on various embodiments of the present disclosure. First, the processor 202 of the second device 200 may control the transceiver 206 to receive, from a first device through a physical sidelink control channel (PSCCH), first sidelink control information (SCI) for scheduling of a physical sidelink shared channel (PSSCH) and second SCI. For example, the first SCI may include information related to frequency resource assignment, information related to time resource assignment and information related to a format of the second SCI. In addition, the processor 202 of the second device 200 may control the transceiver 206 to receive, from the first device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and receive, from the first device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Based on an embodiment of the present disclosure, an apparatus adapted to control a second user equipment (UE) may be provided. For example, the apparatus may comprise: one or more processors; and one or more memories operably connected to the one or more processors and storing instructions. For example, the one or more processors may execute the instructions to: receive, from a first UE through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and receive, from the first UE through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Based on an embodiment of the present disclosure, a non-transitory computer-readable storage medium storing instructions may be provided. For example, the instructions, when executed, may cause a second device to: receive, from a first device through a physical sidelink control channel (PSCCH), first sidelink control information (SCI) for scheduling of a physical sidelink shared channel (PSSCH) and second SCI, wherein the first SCI includes information related to frequency resource assignment, information related to time resource assignment and information related to a format of the second SCI; and receive, from the first device through the PSSCH, the second SCI including a source ID and a destination ID and an inter-UE coordination message. For example, the inter-UE coordination message may include information related to a preferred resource or information related to a non-preferred resource, and information representing that the inter-UE coordination message is transmitted may be included in the first SCI or the second SCI.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
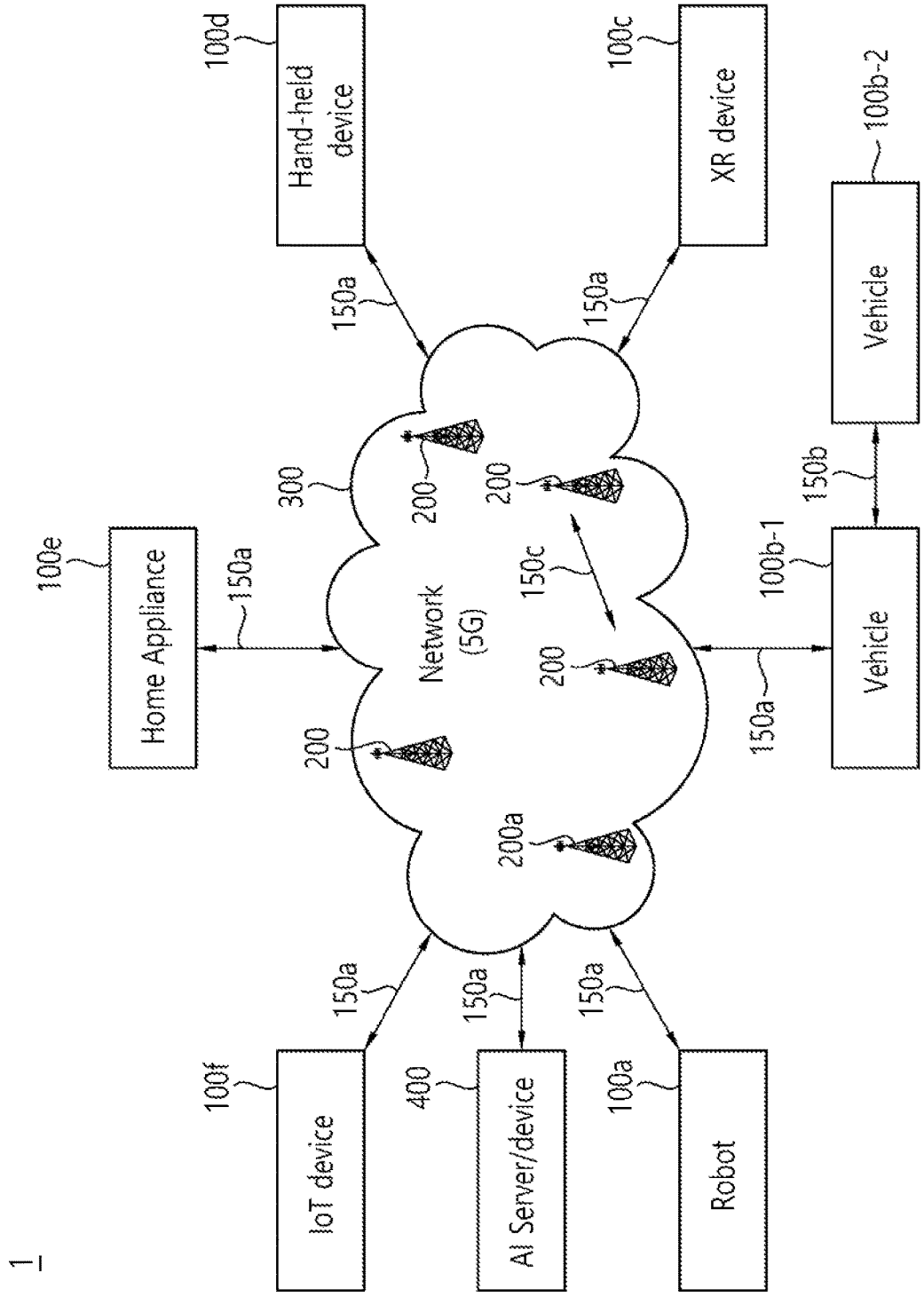
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a B S/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
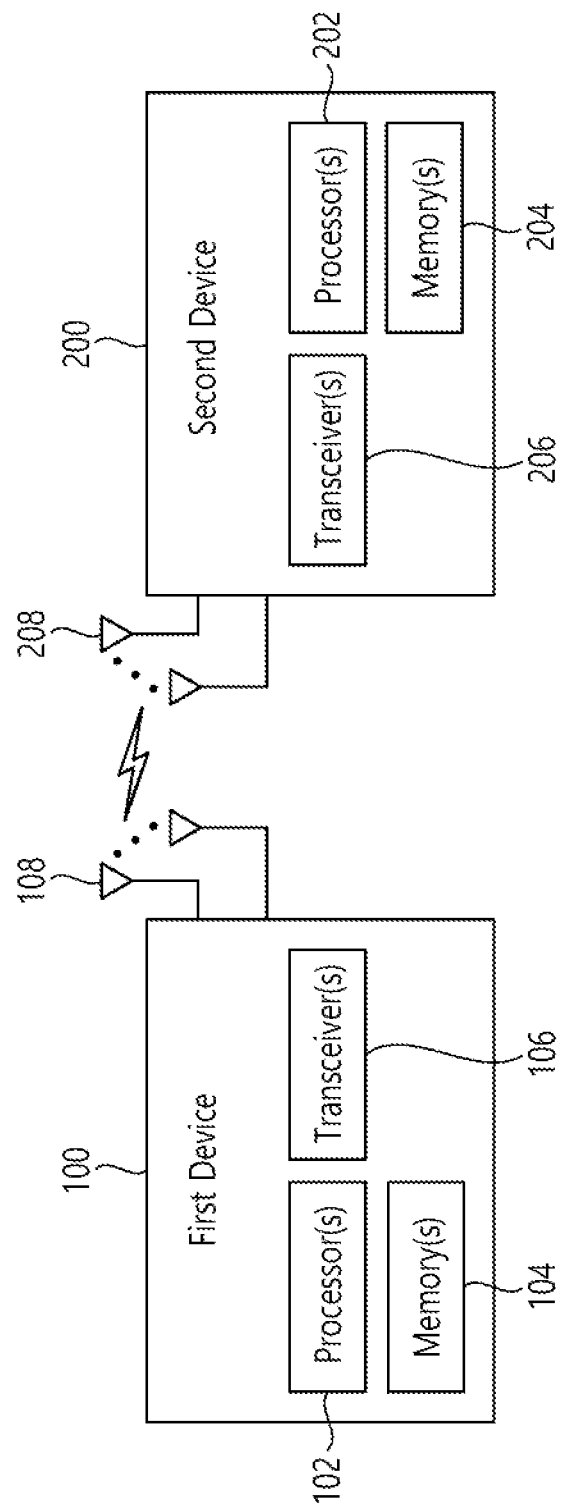
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
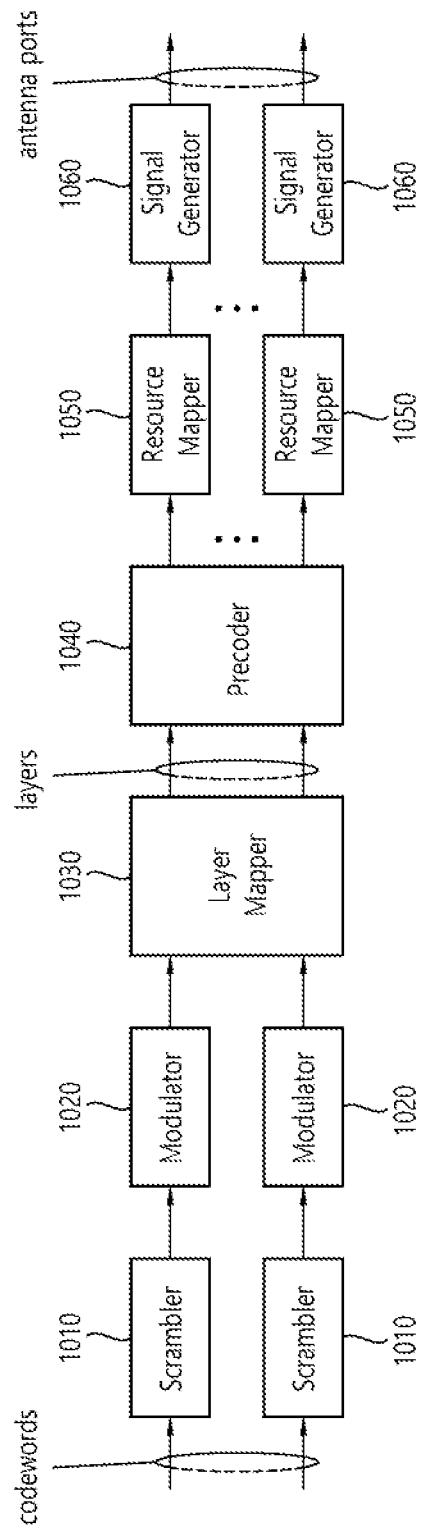
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
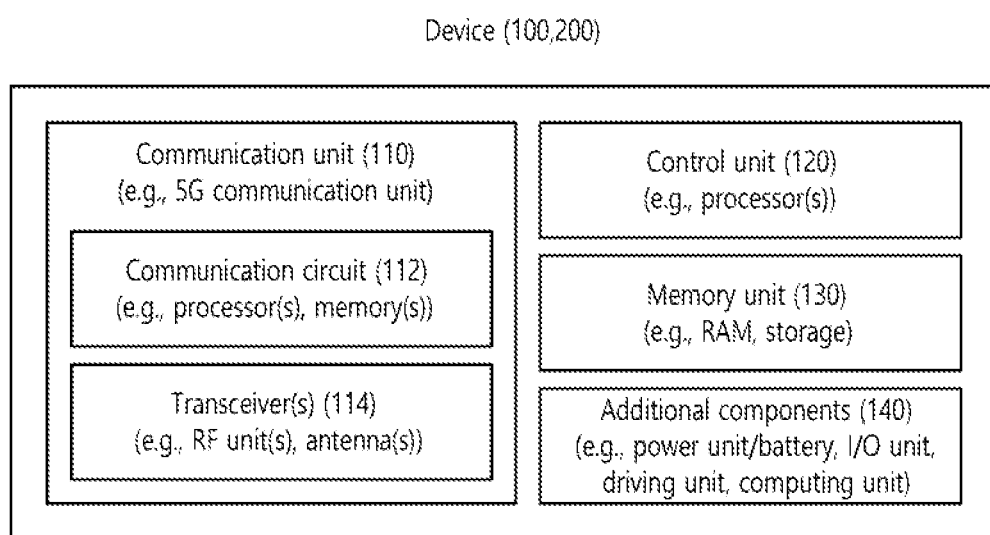
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 13), the vehicles (100*b*-1 and 100*b*-2 of FIG. 13), the XR device (100*c* of FIG. 13), the hand-held device (100*d* of FIG. 13), the home appliance (100*e* of FIG. 13), the IoT device (100*f* of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
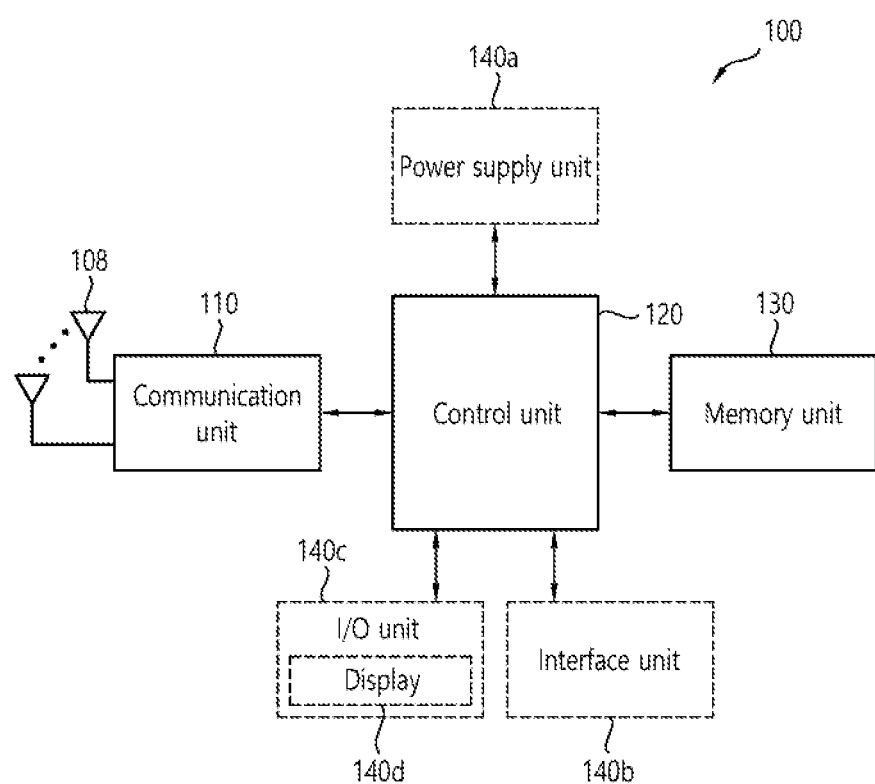
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 18:
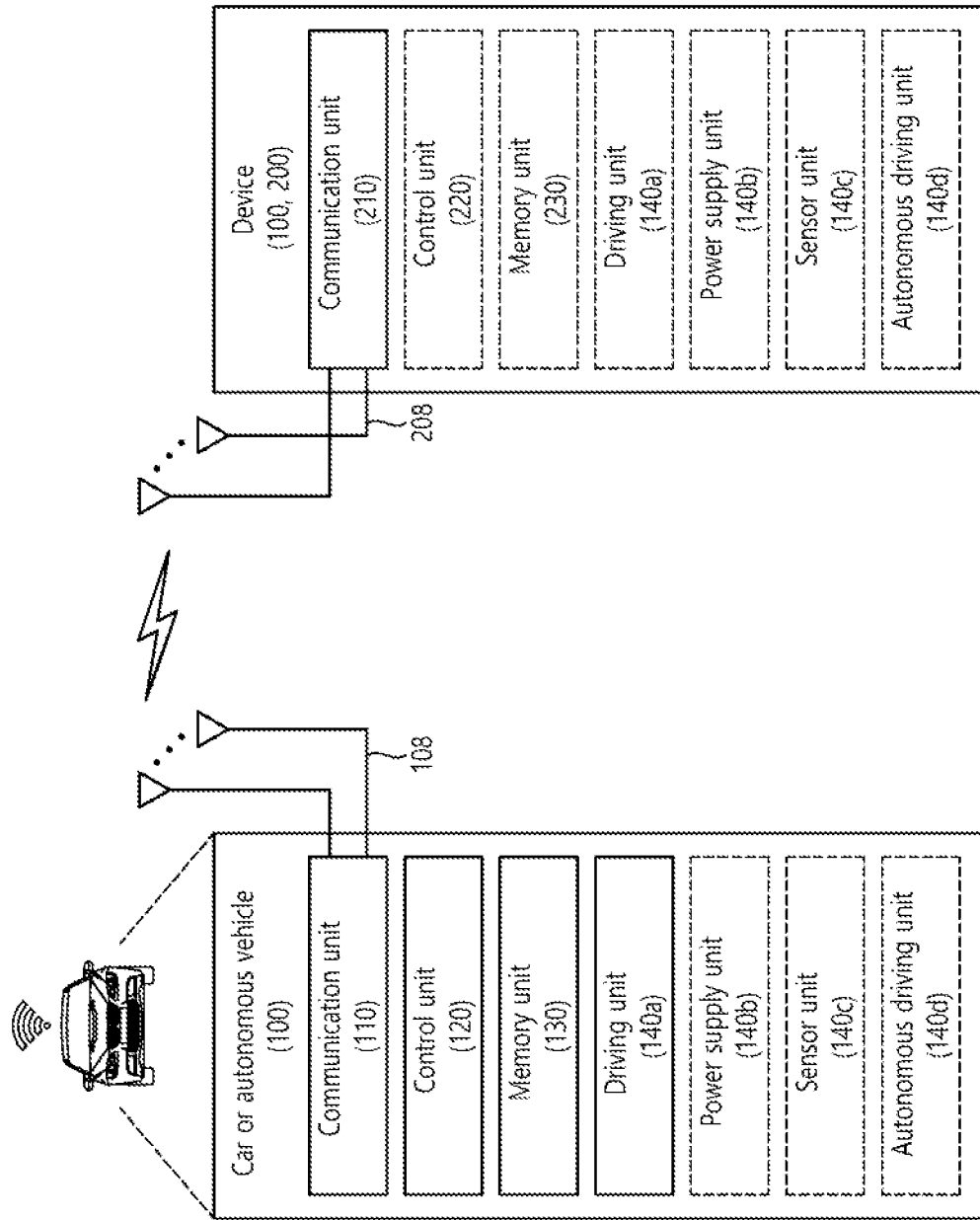
FIG. 18 shows a vehicle or an autonomous vehicle, based on an embodiment of the present disclosure.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
   transmitting, to a second device, first sidelink control information (SCI) for scheduling of a physical sidelink shared channel (PSSCH) and second SCI, wherein the first SCI includes information related to frequency resource assignment, information related to time resource assignment and information related to a format of the second SCI; and
   transmitting, to the second device, the second SCI including a source ID and a destination ID, and inter-UE coordination information,
   wherein the inter-UE coordination information includes information related to a preferred resource or information related to a non-preferred resource, and
   wherein, in logical channel prioritization (LCP), a priority of a medium access control (MAC) control element (CE) for the inter-UE coordination information is lower than a priority of data from a sidelink control channel (SCCH) and a priority of a MAC CE for sidelink (SL) channel state information (CSI) reporting, and the priority of the MAC CE for the inter-UE coordination information is higher than a priority of data from a sidelink traffic channel (STCH).

2. The method of claim 1, further comprising:
   generating, based on the LCP, a MAC protocol data unit (PDU) including the inter-UE coordination information,
   wherein the inter-UE coordination information is included in the MAC CE for the inter- UE coordination information in the MAC PDU.

3. The method of claim 1, wherein the destination ID is a destination ID that is already used in sidelink transmission.

4. The method of claim 1, wherein information representing that the inter-UE coordination information is transmitted is included in the first SCI.

5. The method of claim 1, wherein the MAC CE and a MAC service data unit (SDU) are multiplexed in a MAC PDU based on the LCP.

6. The method of claim 1, wherein the information related to the format of the second SCI represents a format of the second SCI related to the inter-UE coordination information.

7. The method of claim 1, wherein the destination ID represents that the inter-UE coordination information is transmitted.

8. A first device adapted to perform wireless communication, the first device comprising:
   one or more memories storing instructions;
   one or more transceivers; and
   one or more processors connected to the one or more memories and the one or more transceivers, wherein the one or more processors execute the instructions to:
   transmit, to a second device, first sidelink control information (SCI) for scheduling of a physical sidelink shared channel (PSSCH) and second SCI, wherein the first SCI includes information related to frequency resource assignment, information related to time resource assignment and information related to a format of the second SCI; and
   transmit, to the second device, the second SCI including a source ID and a destination ID, and inter-UE coordination information,
   wherein the inter-UE coordination information includes information related to a preferred resource or information related to a non-preferred resource, and
   wherein, in logical channel prioritization (LCP), a priority of a medium access control (MAC) control element (CE) for the inter-UE coordination information is lower than a priority of data from a sidelink control channel (SCCH) and a priority of a MAC CE for sidelink (SL) channel state information (CSI) reporting, and the priority of the MAC CE for the inter-UE coordination information is higher than a priority of data from a sidelink traffic channel (STCH).

9. The first device of claim 8, wherein the one or more processors further execute the instructions to generate, based on the LCP, a MAC protocol data unit (PDU) including the inter-UE coordination information,
wherein the inter-UE coordination information is included in the MAC CE for the inter- UE coordination information in the MAC PDU.

10. The first device of claim 8, wherein the destination ID is a destination ID that is already used in sidelink transmission.

11. The first device of claim 8, wherein information representing that the inter-UE coordination information is transmitted is included in the first SCI.

12. The first device of claim 8, wherein the MAC CE and a MAC service data unit (SDU) are multiplexed in a MAC PDU based on the LCP.

13. The first device of claim 8, wherein the information related to the format of the second SCI represents a format of the second SCI related to the inter-UE coordination information.

14. The first device of claim 8, wherein the destination ID represents that the inter-UE coordination information is transmitted.

15. A processing device adapted to control a first device, the processing device comprising:
one or more processors; and
one or more memories operably connected to the one or more processors and storing instructions, wherein the one or more processors execute the instructions to:
transmit, to a second device, first sidelink control information (SCI) for scheduling of a physical sidelink shared channel (PSSCH) and second SCI, wherein the first SCI includes information related to frequency resource assignment, information related to time resource assignment and information related to a format of the second SCI; and
transmit, to the second device, the second SCI including a source ID and a destination ID, and inter-UE coordination information,
wherein the inter-UE coordination information includes information related to a preferred resource or information related to a non-preferred resource, and
wherein, in logical channel prioritization (LCP), a priority of a medium access control (MAC) control element (CE) for the inter-UE coordination information is lower than a priority of data from a sidelink control channel (SCCH) and a priority of a MAC CE for sidelink (SL) channel state information (CSI) reporting, and the priority of the MAC CE for the inter-UE coordination information is higher than a priority of data from a sidelink traffic channel (STCH).

16. The processing device of claim 15, wherein the one or more processors further execute the instructions to generate, based on the LCP, a MAC protocol data unit (PDU) including the inter-UE coordination information,
wherein the inter-UE coordination information is included in the MAC CE for the inter-UE coordination information in the MAC PDU.

17. The processing device of claim 15, wherein the destination ID is a destination ID that is already used in sidelink transmission.

18. The processing device of claim 15, wherein information representing that the inter-UE coordination information is transmitted is included in the first SCI.

19. The processing device of claim 15, wherein the MAC CE and a MAC service data unit (SDU) are multiplexed in a MAC PDU based on the LCP.

20. The processing device of claim 15, wherein the information related to the format of the second SCI represents a format of the second SCI related to the inter-UE coordination information.

* * * * *